Sept. 15, 1970   J. J. WEINSTOCK   3,529,165
BETA RADIATION SOURCE AND THE FABRICATION THEREOF
Filed Oct. 22, 1965

INVENTOR.
Jaques J. Weinstock
BY
ATTORNEY.

United States Patent Office 3,529,165
Patented Sept. 15, 1970

3,529,165
BETA RADIATION SOURCE AND THE
FABRICATION THEREOF
Jacques J. Weinstock, 71—47 171st St.,
Flushing, N.Y. 11365
Filed Oct. 22, 1965, Ser. No. 501,439
Int. Cl. G21f 5/02; G21h 5/00
U.S. Cl. 250—106                           12 Claims

ABSTRACT OF THE DISCLOSURE

Beta ray point source and fabrication method therefor wherein the beta ray emitting isotope constitutes the dried residue of a solution thereof confined on the end of a support mandrel by surrounding hydrophobic material with said isotope being overlaid by a protective film and disposed with a longitudinally extending collimating tube.

---

This invention relates to beta radiation sources and more particularly to an improved method of fabrication of, and construction for, beta radiation sources incorporating a radioactive isotope as a beta ray emitter.

Beta ray backscatter techniques are now widely employed in non-destructive measurements of the thickness of thin coatings on basal substrates. One of the problems attendant the practical utilization of the so-called beta backscatter phenomenon in such thickness measurements is the necessary selective delimitation of a measurement area for exposure to incident beta radiation. The continual trend toward increasing miniaturization has accentuated this problem since the workpiece areas to be subjected to measurement have become smaller and smaller with an accompanying relative increase in the degree of curvature thereof for areas of non-planar character. Due to the inability of the art to heretofore produce a high intensity, highly collimated beta ray source, conventional beta backscatter gauging equipment delimits the area of the workpiece exposed to beta radiation by the use of aperture defining means such as removable aperture plates having varying sizes and shapes of apertures therein or adjustable aperture defining mechanisms whereby aperture dimensions can be easily varied by the operator in accordance with the dictates of the workpiece being subjected to measurement. Such expedients, however, are necessarily expensive and additionally require a selection by the machine operator of a particular sized and shaped aperture to obtain optimum results for any given workpiece.

This invention may be briefly described as an improved method of fabrication of, and construction for, beta radiation sources incorporating a radioactive isotope as a beta ray emitter that is characterized by a high degree of radiation intensity and a high degree of beta ray collimation.

Among the advantages of the subject invention is the provision of a highly collimated, high intensity beta ray source employing a radioactive isotope as a beta ray emitter; the permitted elimination of the conventionally employed aperture defining means for many, if not most, sizes and shapes of workpiece, the provision of a higher degree of accuracy of measurement with an appreciable diminution of exposure time, and the provision of higher radiation intensities with diminished quantities of radioactive isotopes.

The primary object of this invention is the provision of an improved fabrication method for, and construction of, beta radiation sources incorporating a radioactive isotope as a beta ray emitter.

Another object of this invention is the provision of an improved, highly collimated, high intensity beta ray source incorporating a radioactive isotope as a beta ray emitter.

Another object of this invention is the provision of beta ray sources having higher radiation intensities with diminished quantities of radioactive beta ray emitting isotopes.

Still other objects and advantages of this invention will become apparent from the following portions of this specification and from the accompanying drawings which exemplify and schematically illustrate the presently preferred sequence of fabrication steps and finished product resulting therefrom that incorporate the principles of this invention.

Referring to the drawings, wherein the component elements of the beta radiation source are disproportionately sized for the purpose of clarity of explanation and understanding:

Figure 1A:
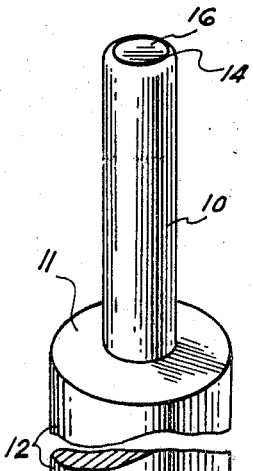
FIGS. 1a through 1g are enlarged schematic and serially sequenced views illustrative of the steps of the fabrication process.
Figure 1B:
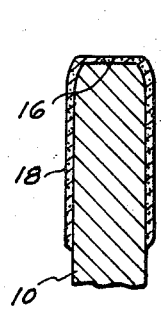
Figure 1C:
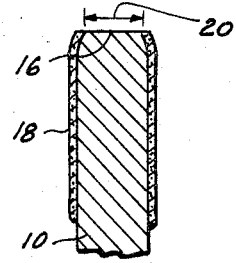
Figure 1D:
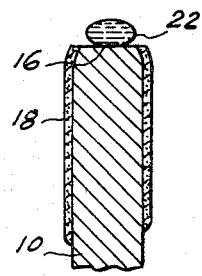
Figure 1F:
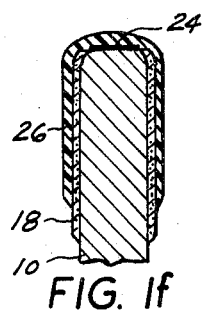
Figure 1E:
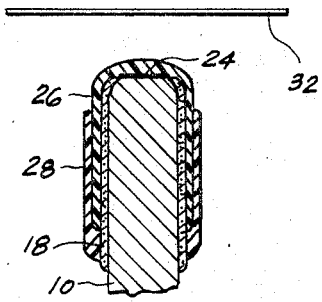
Figure 1G:
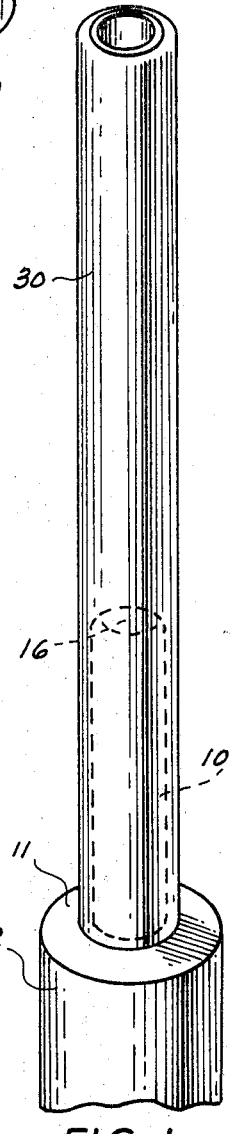

In the practice of the invention, a needlelike support mandrel 10 is mounted or formed so as to etxend from a relatively larger base member 12. The support mandrel 10 may be of any suitable shape, but is preferably machined so as to be essentially cylindrical and having its free end machined so as to provide an arcuate bevel 14 merging into a substantially planar terminal end portion 16 of reduced diameter. The support mandrel 10 as so constituted is then given a coating of a film 18 of material non-wettable to the radioactive isotope containing solution, as hereinafter described, or "hydrophobic" material, suitably a fluorocarbon such as S–122 Fluorocarbon as manufactured by the Miller-Stephanson Chemical Co. A portion of the hydrophobic film 18 is then selectively removed, as by grinding, from the terminal end portion 16, as for example the portion thereof disposed intermediate the lines 20, to expose the base material and to provide a solution receiving and retaining area.

A minute quantity of a solution of a beta ray emitting radioactive isotope, as for example one tenth of a microliter or less, is then introduced on to the solution receiving and retaining area to there form a discrete pool or droplet 22 of finite dimension bounded by the non-wettable material film. This droplet 22 is then evaporated leaving a concentrated solid deposit 24 of a beta ray emitting isotope selectively located on the planar top portion 16 (or on a selected portion thereof) of the support mandrel 10.

The end portion of the isotope coated support mandrel 10 is next dipped or otherwise coated with a thin protective synthetic resin film 26, as for example, by application of a solution of methyl methacrylate in methyl ethyl ketone, which, after setting, serves to provide an initial seal for the isotope deposit 24 on the mandrel. After setting of the film 26, the sides of the support mandrel 10 and the adjacent surfaces 11 of the base 12 are coated with an epoxy cement film 28 and a collimating sleeve 30 is forced onto the mandrel 10 over an interposed thin film 32 of polyethylene terephthalate resin, such as Mylar, to form, after setting of the epoxy cement, an essentially leakproof monolithic structure.

Figure 2:
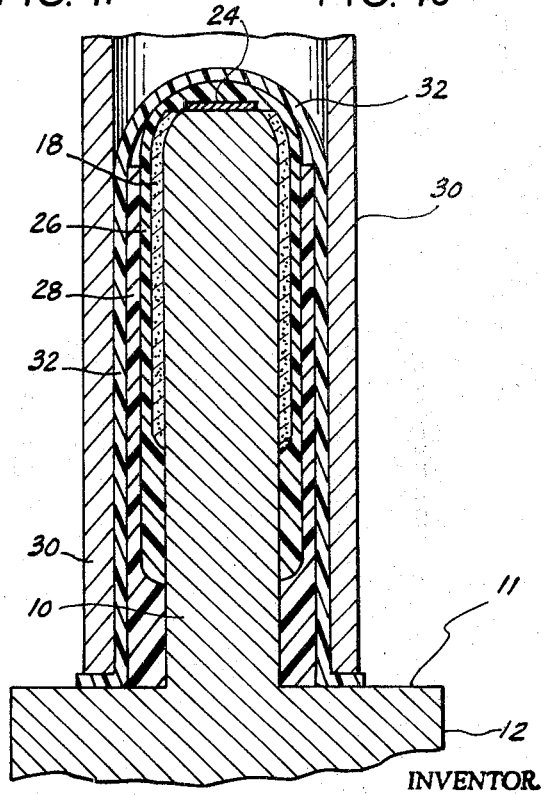
FIG. 2 is an enlarged vertical sectional view schematically illustrative of the improved construction resulting from the hereindescribed fabrication method.

FIG. 2 illustrates the resultant essentially leakproof construction wherein the needlelike support mandrel 10 having a small but highly concentrated deposit 24 of the beta ray emitting radioactive isotope material disposed on its planar upper surface 16 is encased in a multilayer protective sheath including an integral methyl methacrylate film 26 bonded to the mandrel and a thin discrete polyethylene terephthalate film 32 epoxy bonded to the mandrel surfaces and assuring a tight force or press fit of the collimating sheath 30 thereabout.

As will now be apparent to those skilled in this art the above described fabrication method avoids the capillarity problems inherent in prior fabrication methods and which served to limit the reductions in dimensions of the source components in prior constructions. The subject invention, due in part to the physical encompassing of the radioactive isotope in an extremely small area and attendant provision of extremely high radiation intensity from a diminutive quantity of isotope has readily permitted the fabrication of units having inside collimating tube diameters as small as .014 to date and it is expected that by utilization of the technique herein described and with additional experience therewith, collimating tube diameters as small as .005 can be obtained without undue difficulty.

The improved performance capabilities inherent in beta ray sources constructed in accordance with the principles of this invention are demonstrated in marked reductions in "beta factors." The "beta factor," which is a measure of source efficiency, has its best or lowest value when the relative proportion of beta rays impinging on the work piece being measured are a maximum compared with those impinging on the surrounding area-delineating surfaces. For example, conventionally constructed Promethium-147 sources containing 10 microcuries of radioactive material were found to have "beta factors" in the range of 3.8 to 4.0 using a Pb/Cu system and a .016 x .500 inch aperture, whereas sources constructed in accordance with the principles of this invention have "beta factors" of 2.3 to 2.5 as compared with a minimum theoretically possible value of 2.0 for the particular system described.

The improved construction also has resulted in marked reductions in the required time for effecting measurements. For example, the so-called optimum time $T_0$ which is definable for the above noted Pb/Cu system as:

$$T_0 = \frac{B^2 K}{N_{Pb}}$$

where

B is the "beta factor" referred to above
K is a constant; and
$N_{Pb}$ is the backscattered count from the coating material (i.e. lead), has been reduced from a range of 1.3 to 2.0 minutes to a range of .20 to .25 minute for the above described Pb/Cu system and aperture by the new source construction and with all the parameters remaining constant. As such, the new source construction permits reductions of as much as 90% in the time required to make thickness measurements.

Having thus described my invention, I claim:

1. In the fabrication of high intensity point-type beta radiation sources the steps of
   applying a hydrophobic coating to a support mandrel,
   selectively removing a small portion of said hydrophobic coating from a selected location thereon to define an exposed solution-receiving area,
   applying a beta radiation emitting isotope containing solution to said receiving area,
   evaporating said solution in situ to leave a localized solidified residue of beta radiation emitting isotope selectively deposited thereon, and
   applying a beta radiation permeable protective film over said deposited isotope to prevent leakage thereof.

2. In the fabrication of high intensity point type beta radiation sources the steps of
   applying a hydrophobic coating to the terminal end portion of a needlelike support mandrel,
   selectively removing a small portion of said hydrophobic coating from the terminal end of said mandrel to re-expose the surface of the mandrel thereat to define a solution-receiving area,
   applying a beta radiation emitting isotope containing solution to said receiving area,
   evaporating said solution in situ to leave a localized solidified residue of beta radiation emitting isotope selectively deposited thereon,
   applying a beta radiation permeable film over said deposited isotope, and
   encasing said isotope bearing needlelike support mandrel in a hollow collimating tube.

3. The method as set forth in claim 2 including the steps of adhesively securing a discrete resin film to the portions of said mandrel disposed in abutting relation with said collimating tube.

4. A beta radiation point source assembly comprising
   a support member
   a beta radiation emitting isotope constituting the dried residue of a solution thereof selectively confined by surrounding hydrophobic material to a small portion of the surface of said support member,
   a protective film overlying said isotope and the adjacent portions of said support member and interfacially bonded thereto,
   a collimating member disposed in enclosing relation about said support member, and
   a discrete resin film disposed intermediate said collimating tube and said support member and adhesively secured to the latter.

5. A beta radiation source assembly comprising
   a needlelike support member having a substantially planar terminal end portion disposed substantially perpendicular to the longitudinal axis thereof,
   a beta radiation emitting isotope selectively deposited on said planar end portion of said needlelike support member,
   a protective film overlying said deposited isotope and the adjacent portions of said support member and interfacially bonded thereto,
   a collimating tube member disposed in encircling relation about said support member, and
   a discrete resin film disposed intermediate the abutting surfaces of said collimating tube and said support member and adhesively secured to the latter.

6. A beta radiation source assembly comprising
   a needlelike support mandrel having its terminal end shaped to provide a substantially planar surface thereon disposed substantially perpendicular to the longitudinal axis thereof,
   a hydrophobic coating selectively disposed on said mandrel to define a radiation emitting zone coincident with at least a portion of said planar surface,
   a beta radiation emitting isotope selectively deposited on said planar surface and confined within said radiation emitting zone,
   a protective film overlying said deposited isotope and the adjacent portions of said mandrel and interfacially bonded thereto, and
   a collimating tube member disposed in encircling relation about said mandrel.

7. The beta radiation source as set forth in claim 6 including a discrete resin film disposed intermediate the abutting surfaces of said collimating tube and said support mandrel and adhesively secured to the latter.

8. A beta radiation source assembly comprising
   a needlelike support mandrel having its terminal end shaped to provide a small substantially planar surface portion disposed substantially perpendicular to the longitudinal axis thereof,
   a hydrophobic coating bounding said planar surface portion on the terminal end of said support mandrel and delineating a radioactive beta ray emitting isotope receiving zone thereon,
   a beta radiation emitting isotope selectively deposited within said isotope receiving zone, a protective film overlying said deposited isotope and the adjacent portions of said mandrel and interfacially bonded thereto, and a collimating tube member disposed in encircling relation about the terminal end of said mandrel.

9. The beta radiation source as set forth in claim 8 including a discrete resin film disposed intermediate the abutting portions of said collimating tube and said support mandrel and adhesively secured to the latter.

10. The beta radiation source as set forth in claim 8 wherein said protective film is methyl methacrylate resin.

11. The beta radiation source as set forth in claim 9 wherein said discrete resin film is polyethylene terephthalate.

12. The method as set forth in claim 1 including the step of encasing said isotope bearing support mandrel in a hollow collimating tube.

References Cited

UNITED STATES PATENTS

| 2,479,882 | 8/1949 | Wallhausen et al. | 250—106 |
| 2,575,134 | 11/1951 | Schultz et al. | 250—106 |
| 2,797,333 | 6/1957 | Reiffel | 250—106 |
| 3,222,524 | 12/1965 | Lee | 250—106 |

ARCHIE R. BORCHELT, Primary Examiner

U.S. Cl. X.R.

117—47, 48; 250—105